United States Patent [19]

Willis et al.

[11] Patent Number: 4,849,966
[45] Date of Patent: Jul. 18, 1989

[54] ANNOUNCEMENT SYSTEM

[76] Inventors: Alan R. Willis, 4 Westland, Martlesham Heath, Ipswich, Suffolk; Ian P. C. Bruce, 4 Pinewood, Woodbridge, Suffolk; David L. Gibson, 14 Salehurst Rd., Ipswich, Suffolk; Hugh Whitbread, 4 Saddlers Place, Martlesham Heath, Ipswich, Suffolk, all of United Kingdom

[21] Appl. No.: 677,053

[22] Filed: Oct. 5, 1984

[30] Foreign Application Priority Data

Oct. 6, 1983 [GB] United Kingdom ............... 8326718

[51] Int. Cl.⁴ .............................................. H04J 3/02
[52] U.S. Cl. ......................................... 370/85; 379/88
[58] Field of Search ................... 370/85, 86, 110.2; 379/88, 89

[56] References Cited

U.S. PATENT DOCUMENTS

| | | | |
|---|---|---|---|
| 3,963,870 | 6/1976 | Couder et al. | 370/85 |
| 4,371,752 | 2/1983 | Matthews et al. | 179/18 B |
| 4,536,877 | 8/1985 | Livingston et al. | 370/85 |
| 4,554,418 | 11/1985 | Toy | 379/88 |
| 4,554,658 | 11/1985 | Marten et al. | 370/85 |
| 4,582,959 | 4/1986 | Myslinski et al. | 379/88 |
| 4,640,992 | 2/1987 | Rose | 379/89 |

OTHER PUBLICATIONS

The Bell System Technical Journal, vol. 60, No. 6, Jul.-Aug. 1981, Murray-Hill (US), T. W. Anderson et al., "Mass announcement subsystem", pp. 1083-1108.
European Conference on Electrotechnics Eurocon, May 3-7, 1977, Venezia (IT), Vulmiere et al.,: "O.S.V. a voice-synthesis unit for telecommunications system", pp. 2.1.3.1-2.1.3.6.
International Switching Symposium Session 23A, Paper 5, Sep. 21-25, 1981, Montreal (CA), W. G. Ekas et al.: "New operational services in PRX-A":, pp. 1-7.

Primary Examiner—Robert L. Griffin
Assistant Examiner—Frank M. Scutch, III
Attorney, Agent, or Firm—Nixon & Vanderhye

[57] ABSTRACT

A system for providing announcements for transmission over a telecommunications network. The system includes a store (15) in which the announcements are stored. A processor (1) controls the writing and reading of announcements to and from the store. A bus (14) carries control signals to and from the processor and a second bus (20) carries digitally encoded audio signals in a synchronous time divided manner, which can be transmitted to the network via an interface (3). Data transfer between the buses is controlled by bus transfer modules (56). The structure is flexible and the system may include one or more code convert logic devices (50) for different types of speech encoding.

31 Claims, 3 Drawing Sheets

ANNOUNCEMENT SYSTEM

This invention relates to systems and apparatus for providing announcements for telecommunications networks. The term announcement is intended to include not only conventional verbal announcements but also any other audio material such as music or modulated data.

Traditionally announcements for the telephone network have been provided by replaying messages recorded on a moving magnetic surface such as a continuous tape. Such techniques make use of analogue recording and replay equipment which has a number of disadvantages. Wear and tear of tape, head and mechanism result in steady degradation of sound quality and general unreliability in high usage applications. Analogue editing is difficult and most changes require the entire announcement to be re-recorded. A major disadvantage of analogue systems is that a caller is connected to an announcement at whatever point it happens to be in its cycle.

Techniques for digitally encoding audio material such as speech have now been developed principally for transmission applications but they have also led to the development of stored-voice services because they permit speech signals to be stored and processed using digital techniques. The three main classes of digital speech coding techniques which have been developed are waveform coding, speech synthesis and synthesis-by-rule. In addition, new customer signalling techniques have been developed so that in addition to the traditional dialling method, signalling by Signalling System Multi-Frequency Number 4 (MF4) is now available. Another alternative is signalling by use of Automatic Speech Recognition.

U.S. Pat. No. 4 371 752, assigned to ECS Telecommunications Inc., relates to a system for the deposit, storage and delivery of audio messages. The system includes an administrative subsystem, call processor subsystems and a data storage subsystem, with a block transfer bus and data storage buses providing for communication between the subsystems. Various interfaces and disk adapters are implemented with units referred to as a "universal control boards" each of which comprises a microprocessor, RAM and ROM memory devices with internal address and control buses. An Intel Multibus connects all the universal control boards.

In an article in The Bell System Technical Journal, Vol. 60 (1981) Jul.-Aug., No. 6, Part 2, pages 1083 to 1108, a mass announcement subsystem (MAS) is described. The MAS includes an ESS processor, a peripheral unit control (PUC) and a mass announcement subsystem (MAS). A peripheral unit bus (PUB) is used as the interface between the ESS processor, the switching network and transmission interface equipment and the PUC. This bus and an extended internal bus (EIB) carry control data.

The present invention provides a system for providing announcements which makes use of digital techniques and whose structure is sufficiently flexible to permit use of any of the speech coding and signalling methods referred to above.

According to the present invention there is provided a system for providing announcements comprising storage means for storing said announcements in digital form, processing means for controlling the writing and reading of said announcements to and from said storage means, a first bus associated with said processing means, a second bus for carrying digitally encoded audio signals in a synchronous time divided manner, and control means for controlling bidirectional transfer of said digitally encoded audio signals between said buses.

The system advantageously includes mounting means such as a back plane for the two buses.

The second bus may, for example, carry thirty-two channels of time divided pulse code modulation signals which can be very easily interfaced to a standard PCM system. The two bus structure allows the system to operate with a range of different coding and signalling methods. The provision of the second bus for speech signals permits speech processing circuits of the system to communicate via that bus and releases the first bus for carrying instructions from and data to the processing means. The second bus may be interfaced in a simple manner to digital networks such as PCM systems or to standard codecs. The bus provides a flexible interconnection for various speech processing modules of the system.

As indicated above the two buses may be on a single back plane. Single card processing modules such as MF 4 receivers can connect to both buses simultaneously and receive and transmit digitally encoded audio data from the second bus, process the data under instructions and data received on the first bus, and transfer the results to the second bus. The two buses can be standard mechanical and electrical interfaces, to which a variety of standard modules may be connected.

Whilst PCM coding is convenient for speech or audio signal transmission, other forms of coding, with lower bit rates, are preferable for storage purposes.

The control means is connected between the buses, and may include code conversion means for converting between a first form of coding used on the second bus and a second form of coding used by said storage means.

Advantageously the conversion means includes a third bus. This enables different or improved forms of coding for storage to be used if desired. Also, a variety of codings could be used simultaneously for signals on different channels of the second bus. The control means can be arranged to allow the system to operate with, for example, waveform encoding or speech synthesis techniques.

The processing means may be a microprocessor and associated system memory.

The storage means may comprise a conventional disc store which is accessible via said first bus. Alternatively the storage means may comprise a magnetic bubble store, a semiconductor memory or an optical disc.

The system may include interface means for providing an interface between the second bus and external telephone lines.

The system may include a signalling subsystem for transferring telephone signalling information between the second bus and the processing means. The signalling subsystem may incorporate a microprocessor. The signalling subsystem can be appropriately designed for operation with conventional dialling signalling, MF 4 signalling or automatic speech recognition.

The system may include a watchdog or monitoring circuit for monitoring operation of one or more of the system circuits.

An embodiment of the invention will now be described, by way of example, with particular reference to the accompanying drawings. In the drawings.

Figure 1:
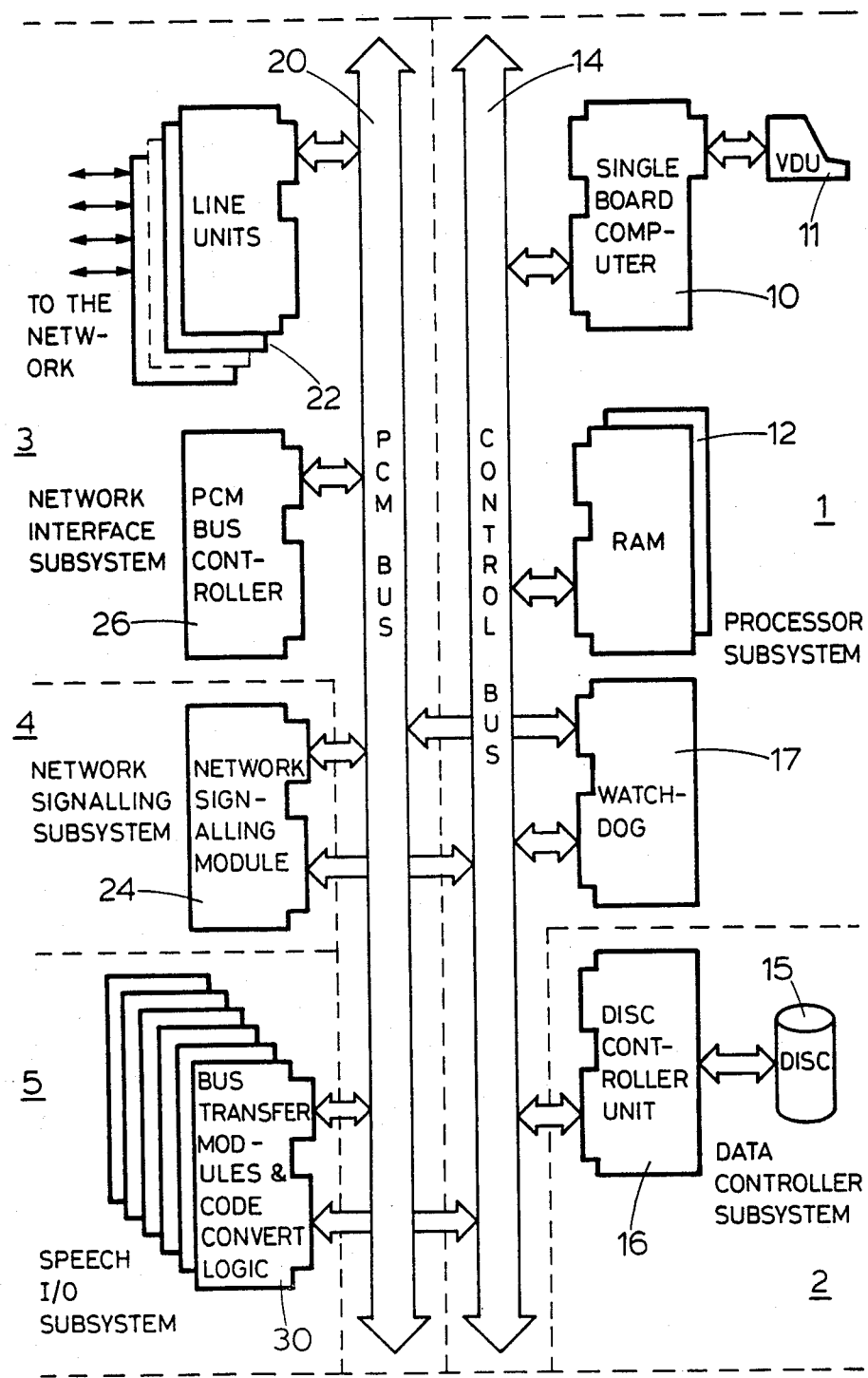
FIG. 1 is a block diagram showing apparatus used by a system for providing verbal announcements in accordance with the present invention.

The present system for providing verbal announcements is a processor based system. The system can be considered as comprising a number of co-operating subsystems, which communicate with one another but are functionally independent. Overall control of the system is provided by a processor subsystem which includes a 16 bit microprocessor 10 having an associated terminal or terminals 11. The processor subsystem 1 has a random access memory 12 which serves as the system memory and which can be accessed via a bus 14. In the particular embodiment the microprocessor 10 is an Intel 8086 device and the bus 14 is an Intel Multibus. The subsystem has associated therewith a watchdog circuit 17 for carrying out periodic monitoring of the operation of the system. The system also includes a data control subsystem 2 which provides the main data storage for encoded announcements. The data control system includes a disc arrangement 15 which can be accessed via the Multibus 14 under the control of a disc control unit 16. The disc arrangement 15 consists of a moving head magnetic disc and the control unit is an ISBC 220 disc controller. This unit can provide an interface for up to four disc drives.

The system includes a second bus 20 which will hereafter be referred to as a PCM bus. This bus is a time divided highway that can carry 32 full duplex 64 Kbit per second channels. A number of subsystems can communicate via this bus. A network interface subsystem 3 provides an interface between the system and the telephone network. The subsystem 3 includes a plurality of line units 22 which terminate incoming lines from the telephone network. The line units 22 operate to separate DC signalling information from speech signals and to send the signalling information on the PCM bus 20 to a network signalling subsystem 4. The speech signals are output onto a particular bus speech channel on the bus 20 which is associated with that particular incoming line. The network interface subsystem also includes a PCM bus controller 26 which generates the necessary control, address and clock signals for units which communicate via the PCM bus 20.

The system also includes a speech input/output subsystem 5 which includes two bus transfer control modules and a code conversion logic device, 30, shown in more detail in FIG. 3 and described below, and connected between the buses 14 and 20. The speech input/output subsystem is the hardware and software responsible for controlling transfer of speech data between the system memory 12 associated with the processor and the PCM bus 20. Each bus transfer module includes an intelligent DMA controller which can take speech samples from 16 channels of the PCM bus 20, recode them to reduce the bit rate and then transfer them onto the bus 14 and subsequently into the system memory 12. The code convert logic operates to recode speech samples from A-law PCM which is used on the PCM bus 20 into adaptive differential PCM (ADPCM) which is used for storage purposes. ADPCM is a form of differential encoding which makes use of the face that successive samples of speech are often highly correlated; the data rate can therefore be reduced by using the difference between successive samples, rather than the actual values of the samples. ADPCM at 32 kbit/sec can produce speech quality which is difficult to distinguish from PCM used for telephone transmission and switching at 32 kbit/sec. Other coding techniques could be used to reduce the data rate for storage by taking advantage of redundancy in the signal or other characteristics of speech (for example the fact that the human ear is less sensitive to high frequency distortion). Recoding at lower bit rates enables storage to be saved.

The system operates to provide an announcement generally as follows. The various verbal announcements which can be output to the telephone network are stored on the disc 15. When the processor 10 receives information which it recognises as a request for a particular verbal announcement that announcement is transferred from the disc 15 into the memory 12. The data is then transferred from the memory 12 under the control of the module 30 and placed in the appropriate channel on the PCM bus 20. From the PCM bus 20 the data is fed to the appropriate line unit 22 and output to the network.

Recording of an announcement takes place in a similar manner but the operations are reversed.

Figure 2:
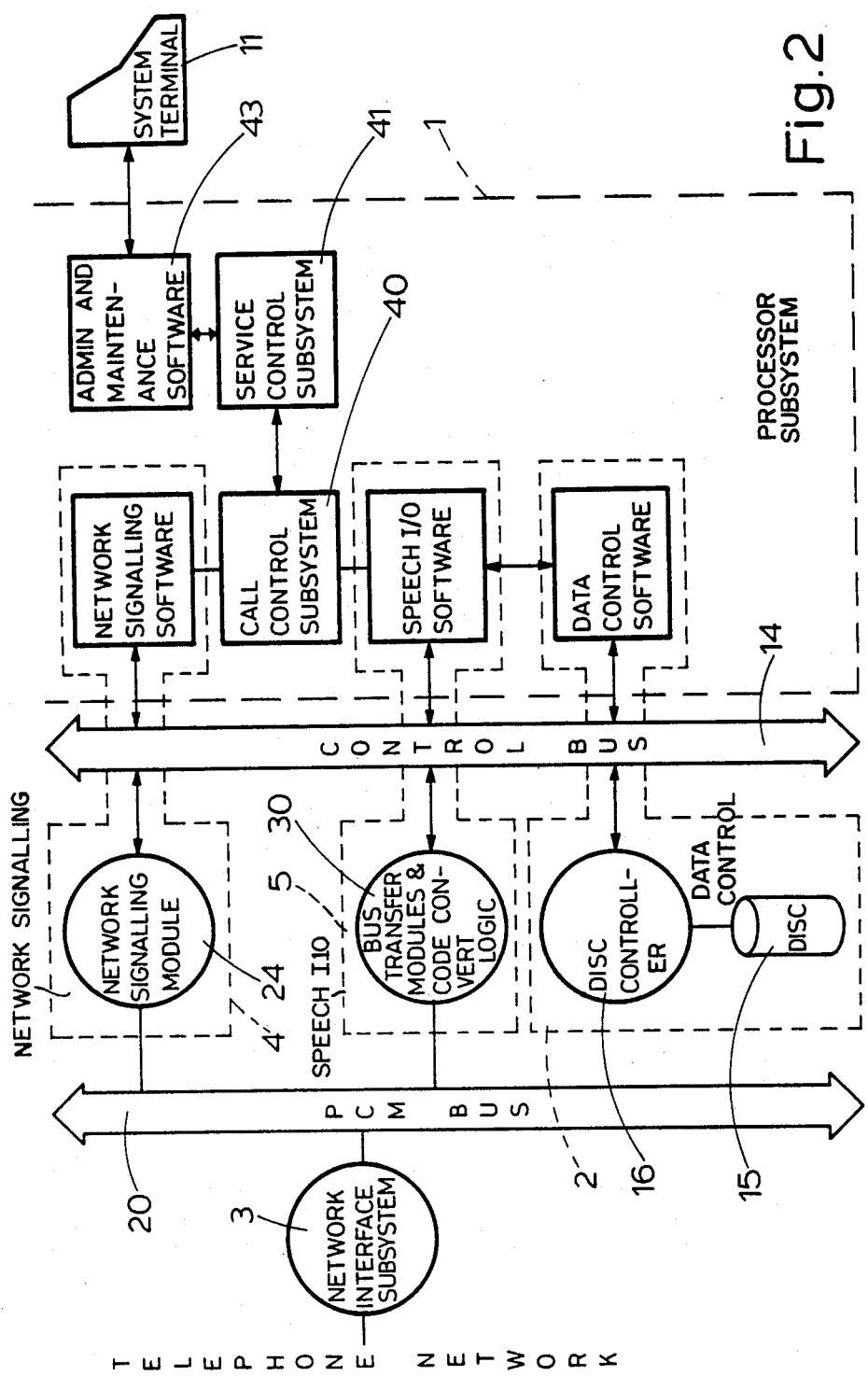
FIG. 2 is a block schematic diagram illustrating the manner in which the apparatus of FIG. 1 operates.

The detailed way in which this is achieved will now be described with reference to FIGS. 1 to 3. FIG. 2 shows in addition to the hardware of FIG. 1 the software processes operated by the various subsystems.

The processor subsystem 1 including the processor 10, system memory 12 and watchdog circuit 17, operates the majority of the system software. The processor 10 operates Intel's proprietary real time operating system which provides facilities for task scheduling, interrupt management, message passing, inter-task synchronisation, device independent input/output and file handling.

The network interface subsystem 3 which includes the line units or cards 22 and the bus controller 26 operates to translate between the electrical and logical requirements of the particular point in the telephone network to which the system is connected and the various speech processing and signalling modules which make up the system. The line cards 22 interface speech and signalling to the PCM bus 20 and carry out any necessary analogue to digital conversion. The PCM bus is a time divided highway that carries 32 full-duplex 64 K bits per second channels. It is used to distribute the speech data to appropriate ones of up to 32 speech channels encoded in A-law PCM provided on the bus 20. It also distributes associated signalling information to the network signalling module 24 and transmits outgoing signalling states to the line cards 22.

Use of the 32 channel PCM 20 bus for carrying audio data is advantageous in that interfacing to 32 channel PCM systems and standard codecs is straightforward. The PCM bus 20 forms a standard flexible interconnection point for the various speech processing modules which make up the system and to decouple these modules from variations in the network interface 3 which often arise. Wave form encoding modules, MF4 detector modules, synthesisers, word recognisers etc can be interfaced with the bus 20 and freely mixed to suit a particular application. The other modules that process signals on the PCM bus connect to it using standard interface circuits.

The network interface subsystem includes its own monitoring circuit, or watchdog. A line card watchdog signal is generated by the network signalling module 24 and is transmitted separately for each line card on the signalling channel of the PCM bus 20. If this signal does not change state at the correct frequency, the line card interprets this as an indication that a channel of the PCM bus corresponding to that particular line card has failed. The line card then automatically places a busy condition on that line to prevent faulty equipment accepting calls.

The network signalling subsystem 4 includes the module 24 which is connected between buses 14 and 20 and is a hardware and software subsystem that transfers network signalling conditions between the PCM bus 20 and a call control subsystem 40 which is software held in the system memory 12. The network signalling module 24 comprises a single card microprocessor based unit that handles signalling for the 32 speech channels on the PCM bus 20. It reduces the load on the main processor 10 by persistence checking incoming signalling and reporting only changes of state to the processor 10. It also applies outgoing signalling conditions on instruction from the processor 10.

The speech input/output subsystem 5 comprises the hardware and software responsible for transfer of speech data between the system 12 and the PCM bus 20.

Speech data is taken from the PCM bus 20 and placed in the system memory by the speech input/output subsystem 5 and it is then transferred to the disc arrangement 15 under the control of the data control subsystem 32. This operation is reversed to replay a recorded announcement.

The bus transfer control module 30 which forms the hardware part of the speech input/output subsystem is an intelligent DMA controller that takes speech samples from 16 channels of the PCM bus, recodes them to reduce the bit rate and then transfers them onto the bus 14 and subsequently into the system memory. The hardware of the speech input/output subsystem 5 is shown in FIG. 3. It includes code convert logic for recoding speech samples from A-law PCM which is used on the PCM bus 20 into adaptive differential PCM which is used for storage purposes. The interface to the code convert logic is designed as a bus so that it is possible for this system to cater for other types of speech coding as they are developed.

Figure 3:
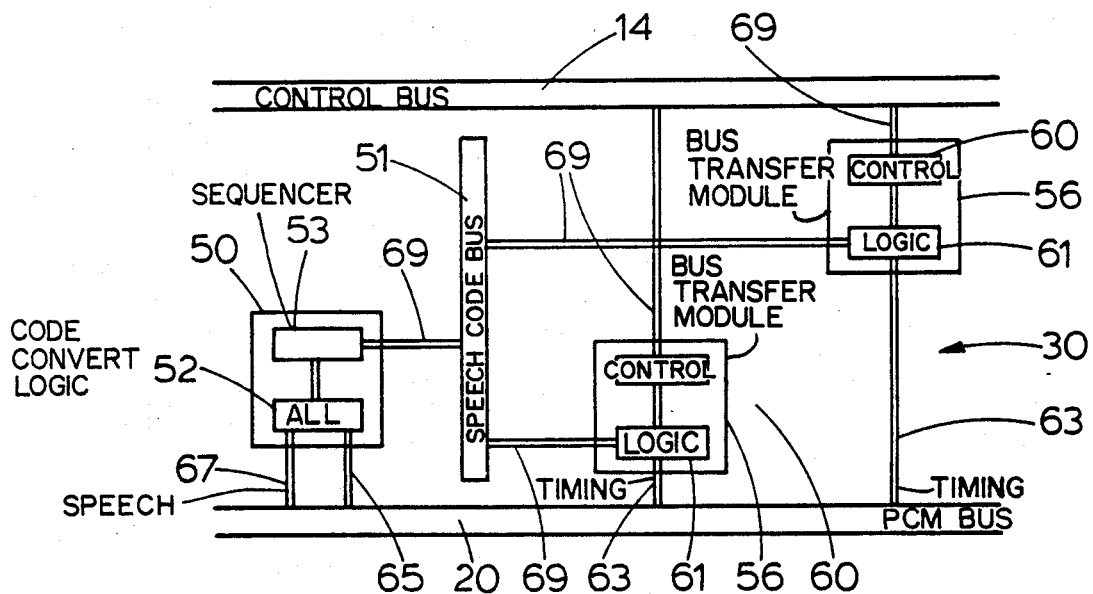
FIG. 3 is a block schematic diagram showing in more detail part of the system of FIGS. 1 and 2.

As shown in FIG. 3, module 30 is connected between the Multibus 14 and the PCM bus 20, and comprises two bus transfer modules 56, code convert logic 50 and a speech code bus 51. Modules 56 include a half-duplex bus transfer control unit 60 and speech interface logic 61. Each module can handle data being transferred to and from sixteen channels of the PCM bus, and it is connected to bus 20 via a line 63 carrying timing signals from the PCM bus.

The code convert logic 50 has arithmetic unit 52 and sequence board 53, and operates to convert PCM samples from bus 20 into adaptive differential PCM samples and vice versa. PCM bus 20 is connected to the bus transfer module 50 by a line 65 which carries timing signals only and a line 67 which carries speech signals only. The lines 69 to the speech code bus 51 and Multibus 14 carry both speech and timing signals.

In operation, speech signals from a particular channel of the PCM bus are recoded by the code convert logic 50, under the direction of one of the bus transfer modules 56. Module 56 receives the necessary timing signals directly from the PCM bus. An encoded byte of data from a single time slot in a PCM channel is put onto the speech code bus 51 by logic device 50 and transferred to bus transfer module 56, where it is stored. Bytes of data from succeeding channels are encoded in turn and stored in respective memories of the modules 56. One of the modules stores data from odd-numbered channels of the PCM bus and the other module stores data from even-numbered channels. 128 bytes from a particular channel are encoded in turn, each byte of 8 bits being reduced to 4 bits and the data stored in the appropriate memory. 128 bytes of data from the PCM bus 20, after encoding, fill a memory and the filing of a second memory is then begun, with 128 bytes from the same channel of the PCM bus being encoded and stored.

In order to encode the speech signals from all channels of the PCM bus with a type of encoding other than ADPCM, code convert logic 50 could be replaced or altered as necessary. To encode speech data on one or more channels of PCM bus 20 differently from the coding on other channels, two or more code convert logic devices 50 could be provided, according to the number of different types of encoding required, between PCM bus 20 via two further lines 65 and 67 and speech code bus 51 via an additional line 69.

If the same encoding is acceptable for the PCM bus and for storage, then the code convert logic 50 and speech code bus 51 can be omitted, and each bus transfer module 56 connected directly, via paths for speech and timing signals, to the PCM bus 20.

The call control subsystem shown at 40 in FIG. 2 is a software only subsystem operated by the processor 10. This controls and coordinates speech input and output, and data control to realise the service specified by a service control subsystem 41 on a particular channel. The subsystem 40 receives information relating to call arrival from the network signalling subsystem 4 and refers to service control 41 for instructions as to how to handle a call. It can report back to service control with call details at the end of a call. The service control system shown at 41 is also a software only subsystem operated by the processor 10. This subsystem determines which service is to be offered when a call arrives from the network. Call control 40 informs the service control subsystem 41 of a call arrival which specifies the service to be offered and any parameters such as the number of repeats of an announcement. On clear down it passes call statistics to an administrative and maintenance subsystem 43 which is software only.

Thus the present system can provide up to 32 output channels of verbal announcements with each channel hearing its announcement from the start. The data control subsystem 2 can provide up to 4 hours of speech storage on the disc and this may be in the form of one long announcement or as many as 250 shorter announcements. Various combinations of announcement replay and record actions can be arranged for each channel. For example, one channel may be arranged to replay a single announcement file whereas the next channel might be set to replay three announcement files in sequence and a further channel may replay one announcement file, then record into another and then replay a third. The announcement associated with a channel and combinations of record and replay actions may be changed either by command from the terminal 11 or at predetermined times under the control of a system clock. Announcements can also be recorded and edited by command from the terminal. The terminal can be located remotely and linked to the system by a modem. The manner in which announcements are replayed is such that the start of announcement coincides with the arrival of a call. The maximum delay between the call arrival and the announcement start is of the order of two seconds.

A feature of the present system is the provision of the two buses 14 and 20. This arrangement makes it possible to plug into the system a wide range of different modules thereby making a very flexible structure. The processor 10 can send instructions to and receive data from those modules over the control bus 14 and the modules can perform speech processing functions as instructed by the processor on the signals they receive over the PCM bus 20. Examples of modules which can be connected between the two buses are the bus transfer module and the network signalling module. Other possible modules which could be provided are speech synthesising modules, automatic speech recognition modules and multi-frequency (MF 4) signalling detection modules. Data transfer between the buses 14 and 20 is controlled by the module 30 and this relieves the load on the processor 10. When the system is provided with MF 4 signalling detection modules or automatic speech recognition modules, the terminal functions can be carried out from a suitably equipped telephone.

Figure 4:
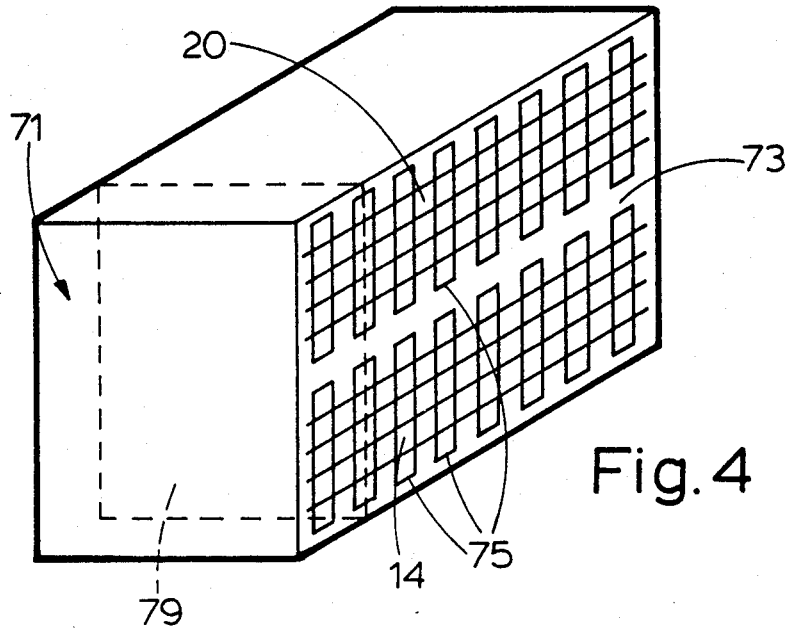
FIG. 4 shows, diagrammatically, a cabinet for mounting a system according to the invention, such as that shown in the preceding figures.

FIG. 4 shows a cabinet 71 which can accommodate a number of cards carrying cicuits for a system according to the present invention. Cabinet 71 has a back plane 73 on which the wirings for a PCM bus 20 and a Multibus 14 are provided. The back plane also carries edge connectors 75 for the cards. As single card 79 (eg an MF 4 receiver) is shown in the cabinet, in broken lines, supported by two edge connectors 75, which bring the card into contact with the buses 14 and 20. The card 79 is therefore connected to both buses simultaneously to operate as described above. Standard cabinets have a Multibus on the back plane; the PCM bus can be provided on a part of the back plane not normally used.

What we claim is:

1. A system for providing announcements comprising:
    storage means for storing and recording digital signals representing announcements from a first signal bus;
    said first signal bus connected to said storage means;
    processing means connected to and associated with said first bus for controlling said storage means to (a) transfer digital signals to/from said first signal bus and (b) record digital signals from said first signal bus;
    a second signal bus for carrying digitally encoded audio signals in a synchronous time divided manner; and
    control means connected between said first and second signal buses for effecting bidirectional transfer of said digitally encoded audio signals between said first and second buses,
    wherein said control means includes transfer means for receiving timing information from both the first and second buses and for transferring audio information therebetween in a predetermined sequence upon request.

2. A system as claimed in claim 1, including backplane means for mechanically supporting both the first and second buses.

3. A system as claimed in claim 1, wherein the storage means is directly connected to said first bus.

4. A system as in claim 1 wherein said second bus is time-divided and conveys a plurality of independent audio signal channels simultaneously to allow a plurality of independent audio channels to be accessed simultaneously by a corresponding plurality of different users.

5. A system as in claim 4 wherein said transfer means includes a memory means for processing voice data for each channel on the time-divided second bus.

6. A system as in claim 1 wherein said transfer means includes a half duplex bus transfer controller.

7. A system as in claim 1 including a short-term store, digital information relating to announcements being passed from said storage means via said short-term store for subsequent passage via the first bus and control means to the second bus.

8. A system for providing announcements comprising:
    storage means for storing and recording digital signals representing announcements from a first signal bus;
    said first signal bus connected to said storage means;
    processing means connected to and associated with said first bus for (a) controlling said storage means to transfer digital signals to/from said first signal bus and (b) recording signals from said first bus;
    a second signal bus for carrying digitally encoded audio signals in a synchronous time divided manner; and
    control means connected between said first and second signal buses for effecting bidirectional transfer of said digitally encoded audio signals between said first and second buses, wherein:
    said second bus carries audio signals digitally encoded using a first form of coding;
    said storage means stores audio announcements digitally encoded using a second form of coding; and
    the control means includes code conversion means for converting between the first form of coding of digital signals as carried on the second bus and the second form of coding of digital signals as stored by said storage means to reduce the data storage requirements for the digital audio signals.

9. A system as claimed in claim 8 wherein said control means includes a third bus.

10. A system as claimed in claim 9, further including a plurality of code conversion means, each connected between said first and second buses, for converting between said first form of coding and respective different forms of coding for storage.

11. A system as in claim 8 wherein said code conversion means includes means for providing differential encoding of speech samples.

12. A system as in claim 11 wherein said code conversion means includes means for recoding from A-law PCM into adaptive differential PCM.

13. A system as in claim 8 wherein said control means includes a third bus associated with the code conversion means.

14. A system as in claim 13 wherein said third bus comprises means for allowing different or improved forms of coding for storage to be accommodated 15. A system for providing announcements comprising:
    storage means for storing and recording digital signals representing announcements from a first signal bus;
    said first signal bus connected to said storage means;

processing means connected to and associated with said first bus for controlling said storage means to transfer digital signals to/from said first signal bus and for controlling said storage means to record signals from said first signal bus;

a second signal bus for carrying digitally encoded audio signals in a synchronous time divided manner;

control means connected between said first and second signal buses for effecting bidirectional transfer of said digitally encoded audio signals between said first and second buses;

interface means connected to said second bus and also adapted for connection to external telephone lines for providing a bidirectional signal interface between the second bus and said external telephone lines; and a signalling subsystem, connected between said second bus and said processing means, for transferring telephone signalling information between the second bus and the processing means.

16. A system as claimed in claim 15, wherein:

said second bus carries a plurality of independent channels of digital signals in a synchronous time-multiplexed manner; and the interface means includes a monitoring circuit for monitoring operation of at least one of the channels of the second bus and for preventing signals from being carried on a faulty channel of the second bus.

17. A system as in claim 15 wherein:

said interface means includes a plurality of interfaces for interfacing with a corresponding plurality of external telephone lines, said interfaces being assigned to different time channels of time division multiplex signals carried by said second bus; and said signalling subsystem includes a signalling module means for signalling each line interface to indicate thereto that the time channel corresponding to that line interface is operational and available to a call-in line connected to that interface.

18. A system as in claim 17 wherein said signalling module means includes a microprocessor, capable of handling all of the audio channels time-divided on said second bus, for checking signalling status and only reporting status changes to the processing means so as to reduce handling requirements thereby.

19. In a telecommunications network of the type including line circuits for transferring speech audio signals between customers' line and trunk lines, an apparatus for providing prerecorded announcements to the customers' lines comprising:

a storage device for storing and recording digital signals representing predetermined audio speech announcements, said digital signals encoded with a first digital encoding scheme;

a first bus connected to said storage device;

a processing means connected to said first bus for controlling said storage means to record signals carried by said first bus and for accessing said stored digital signals via said first bus;

a second bus, adapted for connection to said line circuits, for conveying digital signals representing audio speech announcements, said second bus digital signals encoded using a second digital encoding scheme; and a transfer module means, connected to said first and second buses, for reading digital signals representing speech from said first bus, converting said read digital signals from said first encoding scheme to said second encoding scheme, and applying said converted digital signals to said second bus, whereby audio signals represented by the digital signals stored by said storage device are applied to the customers' lines.

20. Apparatus as in claim 19 wherein signals are transmitted over the trunk lines in the form of a synchronous, multiplexed code, and said second digital code is substantially similar to said synchronous, multiplexed code.

21. Apparatus as in claim 20 wherein said first code employs fewer bytes than said second code to encode the same audio information, whereby the storage requirement of said storage device is minimized.

22. Apparatus as in claim 19 further comprising a random access memory means, connected between said first bus and said transfer module, for storing signals transmitted over said first bus from said storage device and for applying said signals stored therein to said transfer module.

23. Apparatus as in claim 19 further including means for supplying control signals to said transfer module, wherein said transfer module transfers coded audio speech signals from said second bus to said first bus and said speech signals are recorded by said storage device.

24. Apparatus as in claim 19 wherein said transfer module means is also for reading digital signals representing speech from said second bus, converting said read digital signals from said second encoding scheme to said first encoding scheme, and applying said converting digital signals to said first bus whereby digital audio speech signals received from said customer's lines are digitized and applied to said storage device.

25. A method of supplying announcements to a telephone subscriber comprising the steps of:

(1) recording digital signals representing a predetermined audio speech announcement from a first bus onto a storage device;

(2) reading said recorded digital signals representing said predetermined audio speech announcement from said storage device;

(3) transmitting said signals read by said reading step (2) from said storage device to a random access memory via said first bus;

(4) storing said signals transmitted by said transmitting step (3) in said random access memory;

(5) converting signals representing a predetermined portion of said announcement stored by said storing step (4) from a first PCM encoded format efficient for storage to a second PCM encoded format different from said first format;

(6) applying said converted signals to a second bus via a transfer module; and (7) transmitting said signals transferred by said transferring step (5) to a line unit in a synchronous time-divided manner over said second bus.

26. Amended as in claim 25 further including the steps of:

(8) receiving digital signals from said line unit representing audio speech of an outside caller connected to said line unit;

(9) applying said received digital signals to said second bus in a synchronous time-divided manner;

(10) converting said signals applied by said applying step (9) to said second bus from said second PCM encoded format to said first PCM encoded format; and

(11) applying said signals converted by said step (10) to said first bus via said transfer module.

27. A time-division multiplexed communications system comprising:
   time-division multiplexed signal bus means for transmitting a plurality of channels of digitally-encoded audio signals;
   processor bus means for transmitting digitally-encoded audio signals, said processor bus means having a timing and protocol which is different from and independent of said multiplexed bus means timing and protocol;
   storing means connected to said processor bus means for selectively recording said digitally encoded audio signals transmitted by said processor bus means; and
   signal transferring means, connected between said multiplexed bus means and said processor bus means, for transferring digitally-encoded audio signals from a selected channel of said multiplexed bus means to said processor bus means and/or from said processor bus means to a selected channel of said multiplexed bus means.

28. A system as in claim 27 wherein: said system further includes:
   means connected to said multiplexed bus means for digitally encoding/decoding said signals transmitted by said multiplexed bus means using a first encoding function, and
   means operatively connected to said processor bus means for digitally encoding/decoding said signals transmitted by said processor bus means using a second encoding function different from said first function; and
   said transferring means includes means for converting between signals encoded using said first function and signals encoded using said second function.

29. A system as in claim 27 wherein said transferring means includes:
   a speech code bus;
   bus transfer module means, connected to said speech code bus and said processor bus means, for transferring signals between said speech code bus and said processor bus means; and
   code convert logic means, connected to said multiplexed bus means and said speech code bus, for transferring digital signals between predetermined channels of said multiplexed bus means and said speech code bus and for altering the encoding of said transferred digital signals.

30. A system as in claim 1 wherein:
   said second bus carries audio signals digitally encoded using a first form of coding;
   said storage means stores audio announcements digitally encoded using a second form of coding; and
   the control means includes code conversion means for converting between the first form of coding of digital signals as caried on the second bus and the second form of coding of digital signals as stored by said storage means to reduce the data storage requirements for the digital audio signals.

31. A system as in claim 15 wherein:
   said second bus carries audio signals digitally encoded using a first form of coding;
   said storage means stores audio announcements digitally encoded using a second form of coding; and
   the control means includes code conversion means for converting between the first form of coding of digital signals as caried on the second bus and the second form of coding of digital signals as stored by said storage means to reduce the data storage requirements for the digital audio signals.

* * * * *